Oct. 12, 1954 L. E. SHUMAKER 2,691,333
APPARATUS FOR BLOCKING ROW CROPS
Filed April 15, 1948 5 Sheets-Sheet 3
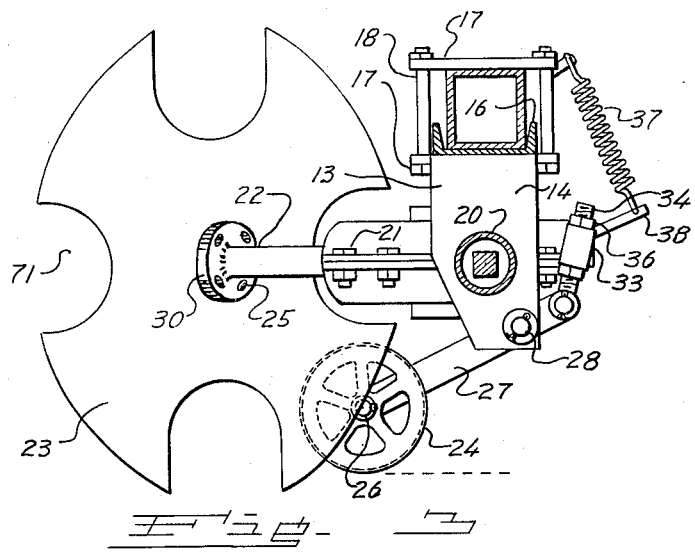
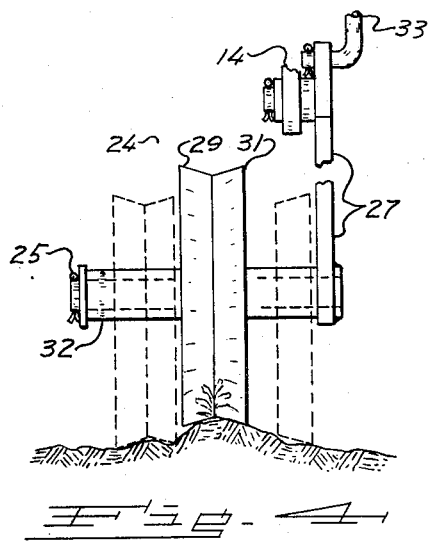
Lawrence E. Shumaker
INVENTOR.
BY
M. A. McGrew
ATTORNEY

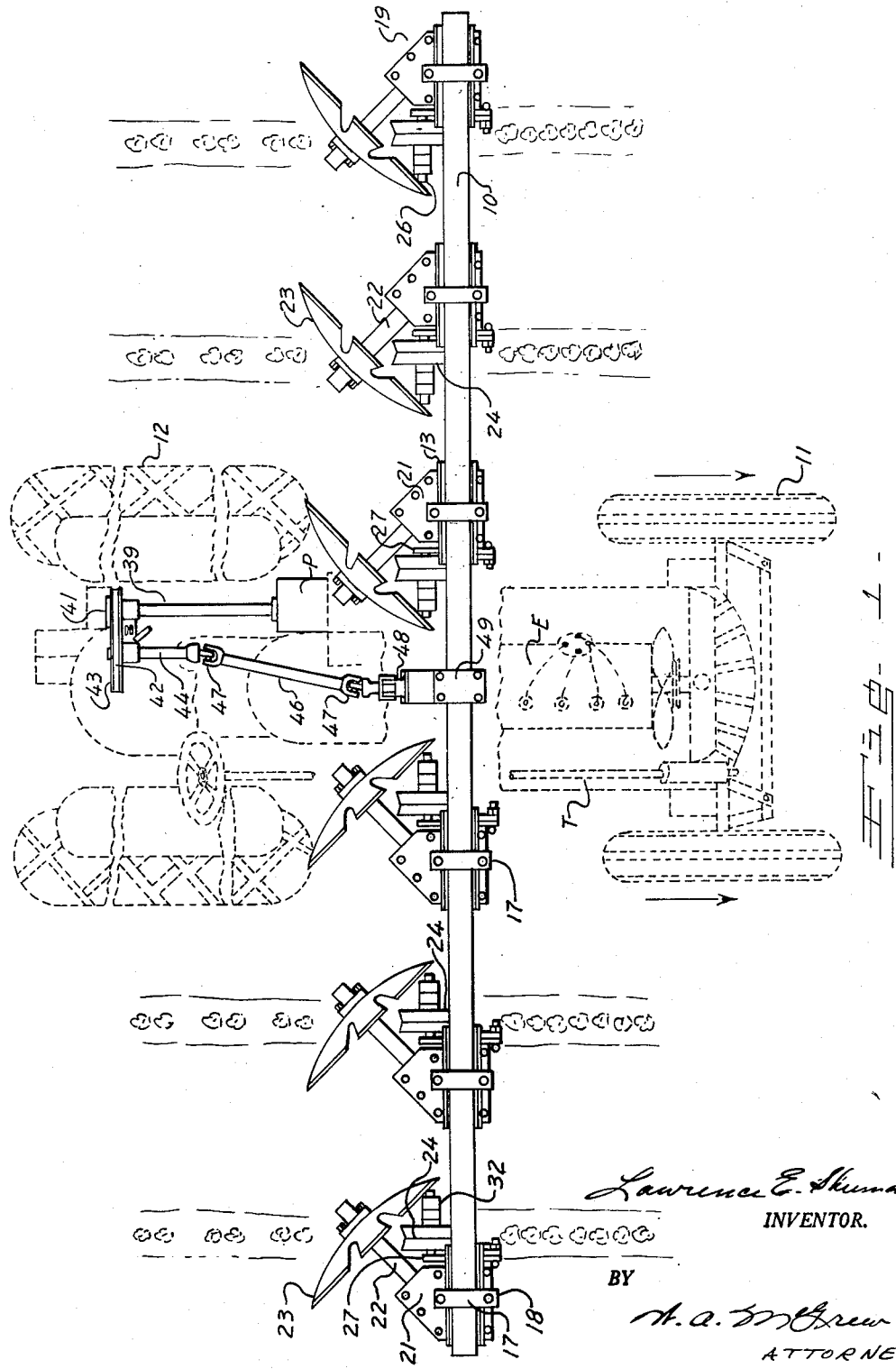

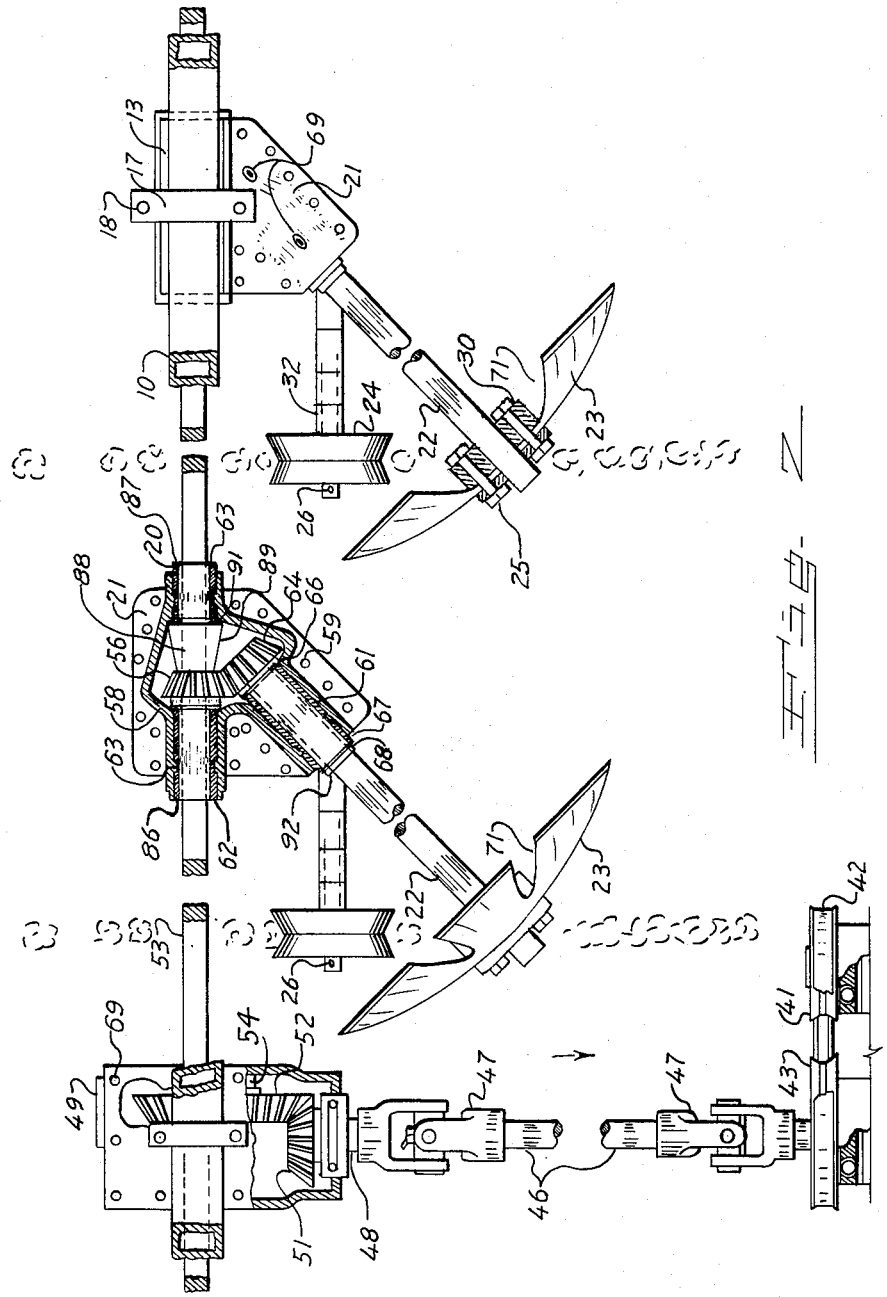

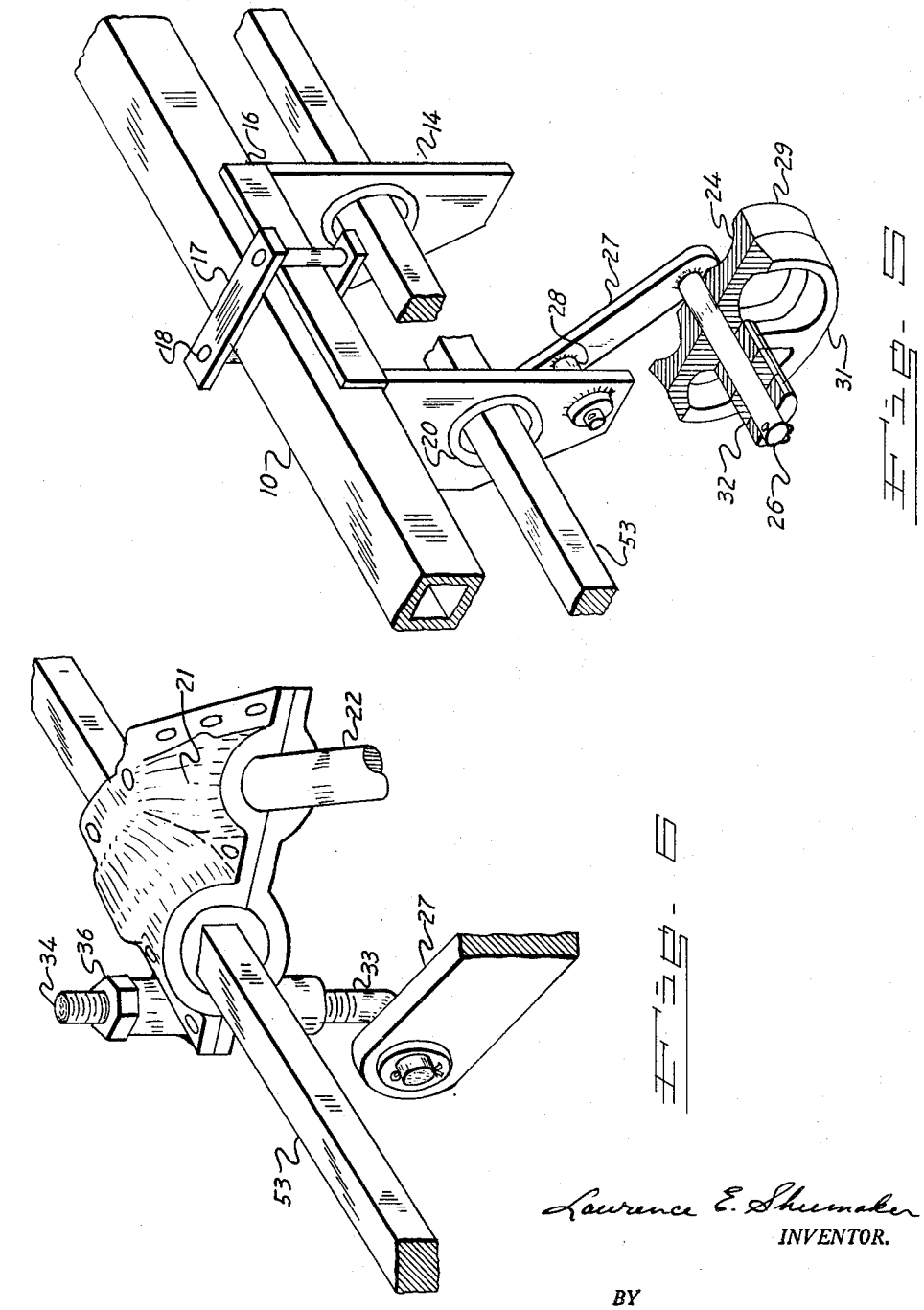

Oct. 12, 1954
L. E. SHUMAKER
2,691,333
APPARATUS FOR BLOCKING ROW CROPS
Filed April 15, 1948.
5 Sheets-Sheet 5
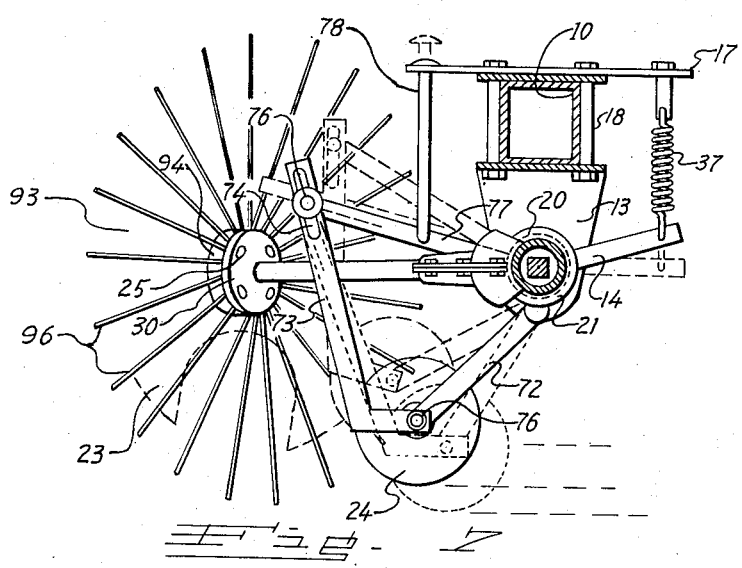
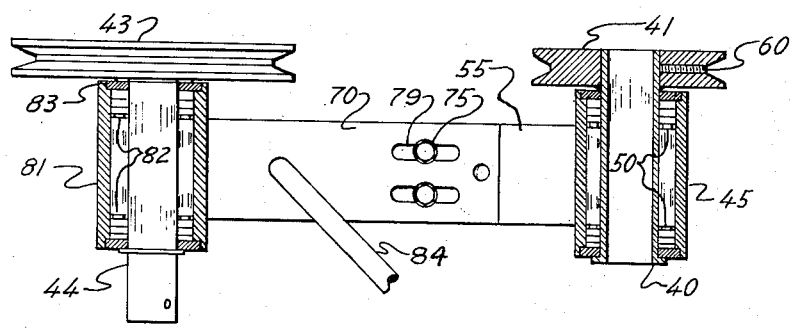
Lawrence E. Shumaker
INVENTOR.
BY
H. A. McGrew
ATTORNEY Patented Oct. 12, 1954

2,691,333

UNITED STATES PATENT OFFICE 2,691,333

APPARATUS FOR BLOCKING ROW CROPS

Lawrence E. Shumaker, Denver, Colo., assignor to Eversman Mfg. Company, Denver, Colo., a corporation of Colorado Application April 15, 1948, Serial No. 21,218

14 Claims. (Cl. 97—14)

This invention relates to apparatus for blocking row crops, and has to do particularly, although not exclusively, with means for blocking various field crops which are planted in rows, such as sugar beets. The present apparatus is an improvement in row crop blockers of the general type disclosed in the United States patent to Soucie 2,373,716, dated April 17, 1945.

Conventionally, row crops, particularly sugar beets, are planted close together in parallel rows, and as the seeds sprout the crop is thinned or blocked by hand to permit proper growth of the remaining plants. Hand blocking is laborious and expensive, as well as presenting a severe migratory labor problem, but has been accepted as necessary in the past because of the unsatisfactory performance of prior mechanical blockers. To perform satisfactorily, a mechanical blocker must necessarily be adjustable to operate on rows of various spacings, be controllable as to the depth of cut, compensate automatically for variations in the contour in the top of each row, as well as also having other similar characteristics.

One of the objects of the present invention is to provide an apparatus for blocking row crops which is an improvement upon the apparatus disclosed by the foregoing Soucie patent.

Another object of the present invention is to provide an improved apparatus of the foregoing character having a plurality of rotatable cutters or blocking discs which are independently adjustable to suit variations in the crop rows, such adjustment being accomplished without changing the cutting angle of the disc or rotary blade.

A further object of the present invention is to provide an apparatus of the foregoing character wherein the cutters and their associated gauging wheels constitute, in effect, floating assemblies whereby the desired correct cutting depth for each cutter may be obtained regardless of any variations in the contour of the ground surface.

Another object of the present invention is to provide such floating assemblies wherein the gauging wheel and the cutter or blocker of each assembly move about different centers but are so arranged that any vertical change in position of the gauging wheel will produce a corresponding vertical change in the elevation of the cutter and in approximately the same amount.

A further object of the present invention is to provide a machine of the foregoing character having gauging wheels of an improved nature and of prefereably split construction to eliminate packing and to give a better cleaning action during use.

A further object of the present invention is to provide an improved device or apparatus, such as the foregoing, which is of relatively simple and sturdy construction, capable of easy assembly and quick and accurate adjustment, as well as one capable of conforming to variations in the surface over which the apparatus travels.

Other objects include the provision of improved means for driving the cutters and for varying the depth to which the cutters penetrate the ground.

The foregoing and other objects and advantages of the present invention will appear from the following description and appended claims when considered in connection with the accompanying drawings forming a part of this specification.

In general, my device includes a frame adapted to be mounted transversely to a tractor for movement along a series of rows of plants. Individual blocker units are slidably mounted along this frame and are adapted to be clamped in position over each row of plants spanned by the frame. Each individual blocker unit includes a rotatable blocking or cutting member, such as a disk disposed at an angle to the row and preferably driven from the tractor engine as the tractor moves along the rows of plants. The cutting member of each unit is raised and lowered automatically according to the contour of the row upon which the unit is operating by a ground-contacting gauge, such as a gauge wheel which is linked in a novel manner to a blocker unit housing supported movably in trunnions by the frame and carrying the shaft of the cutting member. This linkage controls the depth of penetration of the cutting member into the soil, regardless of variation in height which inevitably occurs between the parallel rows of plants, and thereby overcomes the tearing, destructive action of prior devices wherein the variation in height from row to row could only be approximately compensated by raising and lowering the entire assembly of several cutting members. Stated in other words, my device adjusts itself to the characteristics of each individual row, and in effect floats on the top or side of each row, the desired depth of cut being maintained automatically in each row.

Each individual blocker unit is driven by a common shaft along which the unit slides. This shaft is preferably polygonal in cross section and driven from the tractor engine. The axis of the shaft is coincident with the axis of the housing trunnions, thus permitting a rocking movement of the housing about the shaft and trunnions in response to movement of the gauging means and allowing the cutting member to be constantly driven, regardless of changes in the elevation of the ground, without use of troublesome universal joints, or the like.

In the drawings:

Fig. 1 is a plan view of my device, illustrating the relationship of my apparatus to a tractor;

Fig. 2 is a partially sectioned exploded plan view of individual blocker units and a common driving unit;

Fig. 3 is a partially sectioned end view of a blocker unit on the frame;

Fig. 4 is an elevation of the gauging wheel assembly of an individual blocker unit;

Fig. 5 is a partially sectioned perspective of a portion of a blocker unit, certain parts of which are omitted for clarity;

Fig. 6 is a partially sectioned perspective view of another portion of my blocker unit, illustrating in general the portion omitted from Fig. 5;

Fig. 7 is a partially sectioned end view of a modified form of gauging wheel employing a thinning wheel; and Fig. 8 is a partially sectioned view of my novel power-transmitting device for attachment to the power take-off of a tractor.

As shown in Fig. 1, my device includes a girder or frame member 10 adapted to be secured transversely across the under side of the frame of a tractor, generally designated T, between front wheels 11 and rear wheels 12, although other forms of mounting may be employed. The frame 10 may suitably be formed as a hollow box girder and supports a series of saddles 13 having downwardly extending parallel legs 14 and a channel-shaped body 16 slidably engaging the frame 10. Clamping plates 17 extend crossways under the body 16 and over the frame 10 in generally parallel relationship, bolts 18 being employed to connect each side of the two plates, thereby adjustably clamping the saddle 13 to the frame 10 at any desired point. Each saddle 13 supports an individual blocker unit, generally designated 19, each of which includes a housing 21 having trunnions 20 journaled in the legs 14, a cutter shaft 22 projecting rearwardly from the housing 21 at an angle to the frame 10, and a rotatable cutting member suitably in the form of a disk secured to the outer end of the shaft 22, as by bolts 30 engaging a washer 35 welded to the shaft 22.

A gauging member such as a wheel 24 is journaled on a stub shaft 26 which projects laterally from an end of an arm 27, the latter being pivotally secured at a point intermediate its ends, as indicated at 28, to a leg 14 of the saddle 13. The gauging wheel 24 is preferably formed as two separate mating sections or wheels 29 and 31, each section having a rim inclined to the section axis so that when assembled in opposed face to face relation on the stub shaft 26 define in combination a concave periphery for the wheel 24. A plurality of washers 32 are telescoped over the shaft to position the wheel 24 along the shaft at the desired point or for insertion between the wheel sections 29 and 31 to permit the wheel 24 to straddle the plants in a row as indicated by the dotted lines in Fig. 4. The washers 32 may be held on the shaft by a cotter key 25, or the like.

The arm 27 is disposed in such manner as to position the gauge wheel 24 reasonably close to and approximately in alignment with the area of contact between the top of the row and the cutting member 23. The opposite end of the arm 17 is pivotally secured to one end of an adjustable link 33, the opposite end of which engages the housing 21 on the side opposite the shaft 22. For example, an opening or collar may be formed in the housing 21 to receive a threaded leg 34 of the link 33, adjustment being attained by a nut 36 on the leg 34 disposed to bear against the upper portion of the opening in the housing. Other well-known devices, such as a turnbuckle could be substituted for link 33 if desired, but the length of the link should incorporate some means for length-wise adjustment. A spring 37 may be secured, for example, to one of the plates 17 and to a member 38 fixed to the housing 21 to urge the cutting member 23 downwardly by pivoting the housing 21 about its trunnions 20.

In the operation of my device, I prefer to employ a tractor having a power takeoff P geared to the tractor engine ahead of the tractor transmission. The power takeoff P of the tractor should include a splined or keyed shaft 39 on which a sleeve 40 may be secured. A housing 45 is supported by spaced bearings 50 mounted on the sleeve 40 and supports a laterally extending arm 55. A pulley 41 is secured to the sleeve 40, as by a set screw 60, and bears against a thrust washer 65 abutting the housing 45.

A lower arm 70 is adjustably secured to the arm 55 as by bolts 75 extending through suitable slots 79 formed in the arms 55 and 70. To the outer end of the arm 70 is secured a housing 81 containing bearings 82 in which a shaft 44 is journaled. A pulley 43, connected by a belt 42 to the pulley 41, is secured to the shaft 44 bearing against a thrust washer 83. A stabilizing rod 84 is secured to the lower arm 70 and shaped as desired for attachment to some fixed point on the tractor such as the drawbar to prevent rotation of the assembly. A shaft 46 having universal joints 47 at each end is secured to the shaft 44 and to a pinion shaft 48 mounted in a gear box 49, which may be suitably clamped to the frame 10. Bevel gear 51 is secured to the pinion shaft 48 within the gear box 49 and meshes with a ring gear 52 which drives a shaft 53, preferably of polygonal cross section. Suitable journals 54 may be provided within the gear box 49 to support the shaft 53. Other forms of gearing, such as a worm and worm gear, may be substituted if desired.

The shaft 53 is generally parallel to and spaced from the frame 10 and extends through each of the housings 21 of the individual blocker units 19 coaxial with the trunnions 20 of each unit. A bevel gear 56, having a polygonal axial opening is disposed within each housing 21, and slidably engages the shaft 53, the gear 56 having an elongated hub 86 mounted in a journal 62. The journal 62 is grooved to receive a flange 63 formed in the housing 21 and abuts a thrust washer 57 interposed between the gear 56 and the journal 62. The housing is formed in two parts clamped together by bolts 59, defining together a cylindrical opening for the shaft 53 and the journal 62 in approximate axial alignment with the trunnions 20. Within the same opening is a second journal 63 in which is mounted a cylindrical section 87 of a thrust member, generally designated 88, which also includes a projecting frusto-conical section 89 engaging the end of the gear 56. A thrust washer 91 may be interposed between the section 89 and the journal 63. The thrust member 88 has a polygonal bore slidably engaging the shaft 53 and in alignment with the bore of the gear 56.

The housing also defines a second opening 61 disposed at an angle to the axis of the trunnions 20 in which a journal 67, similar to journal 62, is mounted. A bevel gear 64, meshing with gear 56, is secured as by welding to the cutter shaft 22, and includes an elongated hub 92 disposed in the journal 67. A snap ring 68 may be employed to prevent inward movement of the shaft 22, and a thrust washer 66 interposed bewteen the gear 64 and the journal 67 to accommodate the outward thrust. Lubrication fittings 69 may be provided for all necessary points such as on gear box 49 and in the housing 21.

The cutting member 23 is preferably formed as a concave convex disk having a sharp edge, the concave face thereof facing generally in the intended direction of movement. Inwardly extending radial slots 71 are formed in the body of the disk 23 and are of substantial dimension. Other forms of cutting devices, particularly those adapted to operate by rotation, may be substituted for the disk if desired, but superior results will usually be obtained by employment of a cutting member of the type described.

To operate my device, I attach the blocker to a tractor, preferably in the manner indicated in Fig. 1. The intended speed of the tractor being known, the belt 42 is placed over pulleys 41 and 43 of selected diameter to drive the shaft 53 at the desired speed. The individual blocker units 19 are then spaced along the frame 10 by loosening the bolts 18 and sliding each unit along the frame 10 and the shaft 53 until the cutting member 23 engages the crest of a row. The bolts 18 are then tightened, thus clamping the units 19 in place. If the crop has only recently sprouted, the gauge wheel 24 is adjusted along the shaft 26 to ride the crest of the row with the sections 29 and 31 together. The spring 37 is tightened until the gauge wheel 24 is in firm contact with the ground. The nut 36 on each of the blocker units 19 is then adjusted to permit the periphery of the cutting member 23 to project downwardly into the ground beyond the gauge wheel 24. This adjustment determines the depth of cut, and will be proportionate to the age of the plants and the depth of planting.

As the clutch of the tractor is engaged, the tractor moves forward and power is delivered from the engine of the tractor through the clutch to the power takeoff P, thence through the belt 42, shaft 44 and gear box 49 to the shaft 53. Since the shaft 53 engages the gear 56, the cutting member 23 will be rotated in direct ratio to the speed of the engine of the tractor T. As the cutter, or disk 23 rotates, the solid portions of the periphery will cut through the top of each row while being drawn forwardly, thus extracting the unwanted plants from the row. As the notches 71 come into alignment with the top of the rows no cutting will occur, thus allowing the plants to remain. Since the cutter 23 is disposed at an angle to the frame and to the row of crops, the angle usually being between 45 and 55 degrees, it will be seen that a given point on the cutting or blocking edge of the cutter moves rearwardly with respect to the frame during rotation, this rearward movement being approximately compensated by the forward movement of the unit when in operation. This action may be likened to that of a hob on a hobbing machine cutting straight teeth on a spur gear. As a result, the action of my cutter closely resembles the action of a hoe drawn across the row of crops.

The speed of revolution of the disk to the wheels in conjunction with the number and size of the slots 71 in the disk 23 determines the interval between and size of the blocked areas and can be varied by changing the speed of the cutter 23 with respect to the speed of the tractor T, as for example, by changing the diameters of the pulleys 41 and 43, or by shifting the transmission gears of the tractor. The latter movement effects a change in the relative speed of the disk 23 to the tractor, because the power takeoff P is driven by the engine rather than through the tractor drive shaft.

In the event the plants have reached a stage of growth where the pressure of the gauge wheel 24 might cause injury, the sections 29 and 31 of the gauge wheel 24 may be separated as indicated by dotted lines in Fig. 4 through the use of washers 32, the separated sections 29 and 31 then bearing against the slopes on either side of the row. As an alternative the sections 29 and 31 may remain in face to face contact and the entire gauge wheel 24 moved to one side or the other by suitable manipulation of the washers 32 to permit the gauge wheel to bear against a slope of the row rather than against the crest, thus avoiding injury to the plants. As the gauge wheel 24 precedes the cutting member 23 along the row it will be raised and lowered in accordance with the changing contour of the row crest. Upward movement of the gauge wheel 24 causes the arm 27 to pivot about its pivot point 28, drawing the link 33 downwardly and causing the housing 21 to pivot in its trunnions 20 about the axis of the shaft 53, which raises the cutting member 23 with respect to the frame 10. By properly proportioning the length of the various members involved in this system of leverages, the upward movement of the cutting member 23 can be made substantially identical to the upward movement of the gauge wheel 24, thus establishing a uniform depth of cut which is unaffected by minor up and down movement of frame 10 or by differences between the contours of the various rows being blocked.

The cutting member 23 is constantly driven throughout this operation, since the rocking axis of the housing 21 is identical with the axis of the shaft 53. Similarly, the cutting angle or angle of approach of the cutter 23 is not changed by this constant movement. As a result I attain very uniform blocking action from my device even in poorly prepared and highly irregular ground.

It is not essential that the precise form of linkage illustrated in Fig. 3 be employed, since the essential characteristics thereof may be incorporated in other ways. For example, as shown in Fig. 7, the stub shaft 26 of the gauge wheel 24 may be supported by an arm 72 pivotally secured to a leg 14 of the saddle 13. A fixed arm 73 is secured to the shaft 26 and extends upwardly therefrom, the upper end of the arm being slotted as at 74. A bolt 76 extends through the slots in the arm 74 into pivotal engagement with an arm 77 secured to the housing 21. A headed bolt 38 is pivotally secured to the arm 77 and extends upwardly through a suitable opening in the plate 17 to limit downward movement of the cutting member 23. Therefore as the gauge wheel 24 is moved upwardly, the movement will be transmitted through arms 73 and 77 to the housing 21 causing the housing to rock about its trunnions 20 and raise the cutting member 23. Adjustment of the depth of cut is attained by loosening the bolt 76 and moving the gauge wheel 24 upwardly or downwardly until the desired position is attained. I may also substitute a weeding or thinning cutter, generally designated 93, for the cutter 23 in instances where a greater percentage of the crop as well as weeds are to be removed. The thinning cutter may, for example, include a hub 94 suitably shaped for attachment to the washer 30 on the shaft 22, and a plurality of relatively small spring steel rods 96 projecting radially from the hub 94. This cutter is operated in a manner generally similar to that previously described, except that the tractor is often driven in low or intermediate gear to increase the speed of the cutter relative to the wheels of the tractor and so obtain a more drastic thinning action.

To those familiar with the problem of blocking, it is believed that the many advantages of my device will be obvious. However, the adaptability of my blocker to various types of tractors should be particularly noted. The position of the power takeoff unit on various makes of tractors varies widely and has in the past necessitated the provision of special brackets for each type to drive implements on the tractor. My subassembly including pulleys 41 and 43 will fit substantially any present type of tractor, and may be employed for driving implements other than my blocker. It may be also noted that my device is less sensitive than others to minor variations in the path of the tractor, since the distance between blocked row areas will remain substantially the same while the tractor is traveling in an approximately straight line.

It should not be understood from the foregoing that my device must necessarily be mounted on a tractor in the precise manner illustrated and described, since other obvious means may be employed with different types of tractors. Neither should it be understood that the precise type of gauge wheel herein described is essential to the operation of my device since other ground-contacting gauging means could be employed. I prefer, however, to employ the wheel herein described since it has proven to be highly satisfactory in service.

I claim:

1. In a device for blocking row crops, a frame, a plurality of blocker units supported by the frame, each of the blocker units including a saddle, a housing supported by the saddle for rocking movement about a generally horizontal axis, a cutter shaft projecting from the housing, a cutter on the shaft, gauging means immediately in front of the cutter including a pair of wheels having sloping rims, an axial shaft for supporting the wheels, means for selectively fixing the position of the wheels on the shaft, an arm fulcrumed to the saddle for supporting the shaft and means for connecting the arm and the housing for rocking the housing in response to upward movement of the gauging wheels.

2. A row crop blocker of the type adapted for attachment to a tractor, comprising an elongated frame, a drive shaft supported from said frame, a plurality of blocker units slidably supported by the frame, each of said units including a housing having external trunnions supporting the housing for rocking movement about the drive shaft, a second shaft, a cutter on the second shaft, a gauge wheel movable along the ground immediately in front of the cutter, a trunnion carried by the frame, a lever arm fulcrumed to the latter trunnion and connected at opposite ends to the gauge wheel and to the housing for raising and lowering the cutter, whereby the depth of penetration of any of said cutters into the ground is substantially unaffected by a vertical movement of the frame and each cutter is movable independently of all other cutters.

3. A powerful transmission for agricultural implements and the like comprising a supporting frame, a housing mounted for sliding movement on the frame and having a pivotal connection therewith, aligned journals in the housing, a gear in the housing having a polygonal bore shaped for slidable engagement with a polygonal driving shaft during sliding movement of the housing on the frame, said gear having an elongated axial hub mounted in one of the journals and a thrust member having an elongated end portion mounted in the other of said journals, the opposite end of the thrust member being enlarged for thrust engagement with the housing and abutting the inner end of said gear, said thrust member also having a polygonal bore in alignment with the bore of said gear for slidably engaging said polygonal driving shaft.

4. In a blocker unit, a supporting frame, a split housing having aligned external trunnions concentric with a predetermined axis on the frame and slidable to different operating positions on the frame, means for clamping the housing together, bearings clamped within the housing, including at least a pair of bearings coaxial with the trunnions, a pair of meshing bevel gears, one of said gears having an elongated hub journaled in one of said bearings in axial alignment with the trunnions, and a thrust member having an elongated hub mounted for rotation in the other of said journals, the inner end of said thrust member engaging the inner end of said gear, said gear and said thrust member each having housing-engaging surfaces transverse to said axis and each having a polygonal bore adapted for sliding driving engagement with a polygonal driving shaft rotatable about said axis.

5. A device for blocking row crops comprising a rigid elongated frame adapted for movement over the rows, a plurality of independent saddles each adjustably clamped to the frame at spaced intervals lengthwise of the frame, a housing journaled in each of the saddles for rocking movement about a common axis generally parallel to the frame, a cutter shaft journaled in each housing, a gear journaled in each housing for driving the cutter shaft, said gear being rotatable about said common axis and having an axial polygonal bore, a polygonal shaft extending slidably through each of said gears, means for driving the shaft, a ground-engaging gauge wheel in front of each cutter, and a lever fulcrumed to each saddle and coupled to the corresponding gauge wheel and housing for moving the housing about said common axis, said frame and polygonal shaft being the sole connection between the adjacent housing whereby each housing may move about its axis independently of adjacent housings.

6. In a row crop blocker of the type adapted for supporting engagement with a tractor, a frame, a plurality of blocker units each pivotally secured to the frame for independent rocking movement about a common generally horizontal axis, each unit including a housing mounted for slidable movement along the frame, a pair of meshing bevel gears within the housing, one of said gears having an axially polygonal bore and being rotatable about said axis, a cutter shaft projecting rearwardly from the housing and secured to the other of said gears, a gauge wheel movable along the ground for raising and lowering the cutter shaft, a polygonal drive shaft extending through each of the units on said axis for driving said one gear, and means for rotating the drive shaft in such direction that the bevel gear teeth along the line of contact move downwardly.

7. A device for blocking row crops and the like for use with a tractor having a power takeoff comprising an elongated frame adapted for attachment to the tractor, a plurality of members depending from the frame, a plurality of blocker units each including a housing having external trunnions journaled in one of the members for rocking movement about a generally horizontal axis and slidable to different operating positions on the frame, a cutter shaft journaled in the housing and projecting rearwardly therefrom at an acute angle to the frame, a generally circular cutter on the outer extremity of the cutter shaft, said cutter having a deeply notched periphery, a common drive shaft extending through the external trunnions of all of the blocker units along said axis, gears in each of the blocker units for coupling the drive shaft to each cutter shaft, means including a pair of meshing gears coupling the drive shaft to the power takeoff for rotating the cutter in such direction that a point on the periphery of the cutter moves rearwardly with respect to the frame while blocking crops in the row, gauge means movable along each row immediately in front of the cutter, and means connecting each gauge wheel with the corresponding housing for raising and lowering the cutter in accordance with variations in the contour of the row.

8. A row crop blocker for attachment to a substantially horizontal frame mounted on a vehicle, comprising a saddle member having spaced leg portions, a housing supported by said legs, a rotary shaft extending in a substantially horizontal direction from and journaled for rotation in said housing, a cutter member carried at the extended end of said shaft, an arm pivoted on a leg of said saddle, a gauge wheel suspended from the arm immediately forward of the other member in the direction of movement of the vehicle with its lowermost surface at a higher elevation than the lowermost surface of said cutter, a link interconnected with said arm and said housing for moving said cutter member upwardly and downwardly as the elevation of the gauge wheel is changed in accordance with the elevation of the surface over which it is moved, and means for varying the effective length of said link to thereby change the range of said up and down movements of the cutter.

9. In a blocker for row crops, a frame, a plurality of blocker units supported by said frame, each of the blocker units including a saddle, a housing having external trunnions journaled in the saddle for rocking movement about a generally horizontal axis, a cutter shaft projecting from said housing having a rotary cutter member on its extended end, a ground-contacting gauge wheel positioned immediately in front of the cutter, an axial shaft for the gauge wheel, means for selectively fixing the position of the gauge wheel on the axle shaft, a pivoted arm on the saddle for supporting the shaft, and means for linking the arm to the housing.

10. In a blocker for row crops, a frame adapted for attachment to a tractor in a substantially horizontal position transverse to a plurality of crop rows and along which the tractor moves, a drive shaft supported beneath the frame in substantially parallel relation thereto, a plurality of blocker units mounted for sliding movement along the frame so as to aline the spacing of said units to the spacing of the crop rows, each said unit including a horizontally-disposed axle shaft in driven connection with said drive shaft and a rotary cutter member carried on the extended end of said axle shaft, means on the frame for supporting each blocker unit for rocking movement about the axis of said drive shaft, a ground-engaging gauge member immediately forward of each cutter member on the line of its cutting penetration of the surface over which it is moved, and a rigid lever member connecting the gauge member with the axle-shaft rocking means so as to vary the cutting elevation of the rotary cutter in accordance with variations in elevation of the row measured by said gauging member.

11. A blocker unit having means for its attachment to a supporting frame for slidable movement to different operating positions, comprising a housing having mating sections forming two alined external trunnions, a third trunnion in converging relation thereto and an intermediate space of greater dimension than the diameter of said trunnions, coaxial bearings within said trunnions, means for clamping said sections in mating contact, means on the housing attached to at least one of said bearings during said clamping contact for conjoint movement of housing and bearings during slidable movement of the unit along the supporting frame, a pair of cooperative beveled gears in the intermediate space of the housing, one of said gears having an elongated hub journaled in the bearing of one of said external trunnions, said gear and hub portion having a polygon bore, a cylindrical thrust member journaled in the bearing of the other of said external trunnions and having a polygon bore, a polygon drive shaft extending through the respective polygon bores in loosely fitting relation thereto, and a cutter-supporting shaft journaled for rotation in said third trunnion in driven connection with the other said gear, whereby the cutter will be maintained in driven relation to the polygon shaft in all positions of the housing on the frame.

12. In a row crop blocker, a blocker unit having means for its attachment to a supporting frame, a saddle under the frame having depending legs, a housing journaled in the legs, a shaft projecting from the housing, a cutter at the extended end of said shaft, a first arm fixed to the housing, a second arm pivoted on one of said legs, a ground-engaging gauge wheel rotatably secured to the second arm in a position immediately forward of the cutter in the direction of movement of the blocker, a rigid slotted member extending between the first and second arms, and fastening means extending through the slot for adjustably securing said member to said first arm, whereby changes in elevation of the gauge wheel will produce an immediate change in elevation of the cutter.

13. A blocker for row crops and the like, comprising a supporting frame inclusive of a saddle, a drive shaft associated with said saddle, a housing supported from said saddle, a cutter member and a ground-contacting gauge attached to said housing, said gauge being positioned immediately in front of the cutter, external journals associated with said saddle for supporting the housing for rocking movement about the axis of said shaft, and gear means within the housing for driving the cutter from the drive shaft.

14. A device for blocking row crops and the like for use with a tractor having a power take-off comprising an elongated frame adapted for attachment to the tractor, a plurality of members depending from the frame, a plurality of blocker units each including a housing having external trunnions journaled in one of the members for rocking movement about a generally horizontal axis, and slidable to different operating positions on the frame, a cutter shaft journaled in the housing and projecting rearwardly therefrom at an acute angle to the frame, a generally circular cutter on the outer extremity of the cutter shaft, said cutter having a deeply notched periphery, a first bevel gear journaled in each housing on said axis and having a polygonal bore, a second bevel gear journaled in each housing rearwardly from the first gear for engagement therewith, said second gear being secured to the cutter shaft, a common polygonal drive shaft extending through the external trunnions of all of the units and the bores of each of said first gears for driving the cutter, means including a pair of meshing gears coupling the drive shaft and the power take-off for rotating the drive shaft in such a direction that the movement of the bevel gears along their line of engagement is downwardly and the movement of a point on the periphery of the cutter while passing through the soil is rearwardly with respect to the frame, guide wheels movable along each row immediately in front of each cutter, and levers fulcrumed to said members and coupling each guide wheel to each corresponding housing for raising and lowering the cutters in accordance with variations in the contours of each individual row.

References Cited in the file of this patent

UNITED STATES PATENTS

| Number | Name | Date |
| --- | --- | --- |
| 674,218 | Robert | May 14, 1901 |
| 1,105,997 | Patric | Aug. 4, 1914 |
| 1,779,834 | Uddenborg | Oct. 28, 1930 |
| 1,786,067 | Horste | Dec. 23, 1930 |
| 1,865,351 | Albaugh et al. | June 28, 1932 |
| 2,028,450 | Hilyard | Jan. 21, 1936 |
| 2,050,454 | Oder et al. | Aug. 11, 1936 |
| 2,275,446 | Leeper | Mar. 10, 1942 |
| 2,381,202 | Bowen et al. | Aug. 7, 1945 |
| 2,426,529 | Silver | Aug. 26, 1947 |
| 2,441,798 | Crump | May 18, 1948 |
| 2,516,794 | Neel | July 25, 1950 |
| 2,558,841 | Gordon | July 3, 1951 |